United States Patent [19]

Tsukiji

[11] Patent Number: 4,602,539

[45] Date of Patent: Jul. 29, 1986

[54] SPINDLE MECHANISM PROVIDING FOR A CONTINUOUS CHANGE IN CUTTING RADIUS, AND METHOD OF OPERATION

[75] Inventor: Yoshihiro Tsukiji, Komatsu, Japan

[73] Assignee: Kabushiki Kaisha Komatsu Seisakusho, Japan

[21] Appl. No.: 577,925

[22] Filed: Feb. 7, 1984

[30] Foreign Application Priority Data

Feb. 7, 1983 [JP] Japan .............................. 58-015394[U]
Mar. 31, 1983 [JP] Japan ................................. 58-053746

[51] Int. Cl.$^4$ ............................................... B23B 3/26
[52] U.S. Cl. ....................................... 82/1.2; 408/151
[58] Field of Search .................. 82/1.2, 1.3, 1.4, 36 R, 82/1 C, 72, 2 R, 73, 67, 68, 79, 81; 408/150, 151, 13, 3, 8, 131; 279/6

[56] References Cited

U.S. PATENT DOCUMENTS

| | | | |
|---|---|---|---|
| 2,820,376 | 1/1958 | Jannenga | 408/151 |
| 2,871,731 | 2/1959 | Stuber | 82/1.2 |
| 3,254,548 | 6/1966 | Gersch | 408/150 |
| 3,654,826 | 4/1972 | Gersch | 82/1.2 |
| 3,740,160 | 6/1973 | Kimura et al. | 408/150 |
| 4,154,555 | 5/1979 | Skrentner | 408/150 |

FOREIGN PATENT DOCUMENTS

| | | | |
|---|---|---|---|
| 3014334 | 10/1981 | Fed. Rep. of Germany | 82/1.2 |
| 49-16398 | 4/1974 | Japan | 82/1.2 |
| 940340 | 10/1963 | United Kingdom | 408/150 |
| 305963 | of 1971 | U.S.S.R. | 82/1.2 |

Primary Examiner—Francis S. Husar
Assistant Examiner—Jerry Kearns
Attorney, Agent, or Firm—Armstrong, Nikaido, Marmelstein & Kubovcik

[57] ABSTRACT

A dual spindle assembly is provided which has a hollow outer member having an inner member rotatably and eccentrically mounted therein. The inner spindle member has a mounting hole defined eccentrically in one end for engaging a cutting tool. In order to make possible a continuous change in the radius of revolution of the cutting tool about the axis of the outer spindle member, a plurality of worms extend parallel to the spindle assembly and are geared to one another for joint rotation. Ball nuts on the worms travel back and forth along the same with the bidirectional rotation thereof. Rigidly interconnecting the ball nuts, a connector surrounds the spindle assembly via a ring rotatably mounted therein. The ring has an inward projection making threaded engagement with the inner spindle member through a slot cut longitudinally in the outer spindle member. The linear travel of the ring with the ball nuts results in the rotation of the inner spindle member relative to the outer. The inventive method calls for the use of a multitip cutting tool having two or more tips of different characters disposed at equal distances from its axis of rotation. The spindle assemby makes it possible to use any one of the tool tips for boring or like operation with a desired cutting radius as the tool is mounted thereto in a prescribed angular position with respect to the outer and inner spindle members.

6 Claims, 11 Drawing Figures

SPINDLE MECHANISM PROVIDING FOR A CONTINUOUS CHANGE IN CUTTING RADIUS, AND METHOD OF OPERATION

BACKGROUND OF THE INVENTION

This invention relates to machine tools in general and in particular, to an improved spindle mechanism which makes possible a continuous change in a cutting radius, that is, the radius of revolution of the cutting tool mounted thereto. The invention is also specifically directed to a method of mounting the cutting tool to the spindle mechanism so as to derive the full benefits from its improved construction.

A change in the cutting radius is essential in some machine tools such as boring machines. A usual expedient to this end is a dual spindle assembly having a hollow outer member in which an inner member is rotatably and eccentrically mounted. The inner spindle member is adapted to eccentrically carry a cutting tool on one end thereof. A change in the relative angular positions of the outer and inner spindle members results in a change in the radius of revolution of the cutting tool about the axis of the outer spindle member. A long familiar means for causing such relative angular displacement of the nested spindle members has been differential gearing, which, however, has brought about several inconveniecnes. One of these is that the driving of the spindle assembly at two or more different speeds has been either impossible or possible only at the cost of very complex construction. Another is that the unavoidable backlashes of the differential gearing have lessened the accuracy of the relative rotary motion of the spindle members.

In order to overcome these difficulties there has more recently been suggested the use of a worm and ball nut mechanism in place of the differential gearing. It makes possible the coaxial connection of the spindle assembly to means for changing its speed of rotation. Also, being practically free from backlash, the mechanism can accurately control the relative angular displacement of the nested spindle members. Further no excessive force is exerted on the mechanism during the revolution of the spindle assembly as the latter is driven by means coupled directly to its inner member.

All these advantages have been offset, however, by one serious drawback. The worm and ball nut mechanism as heretofore suggested and used for the purpose in question has had but one worm laid parallel to the spindle assembly, and the axial motion of the ball nut on the worm has been translated into the relative angular motion of the two spindle members. As the spindle assembly is used for machining for an extended period of time, the reactive forces of the cutting operation have been easy to apply torsional stresses to the means for translating the axial motion of the ball nut into the relative angular motion of the spindle members. Such torsional stresses have eventually given rise to play between the inner and outer spindle members, thereby preventing the accurate control of the cutting radius.

Another problem encountered in the use of the spindle mechanism providing for a change in the cutting radius is the curtailment of the number of cutting tools such as boring bars used for various operations. The prior art devices have allowed, of course, the boring of various diameter holes with one and the same tool, but different tools have had to be used for different cutting operations. By the term "different cutting operations" it is meant, for instance, the cutting of aluminum, that of steel, rough machining, and fine or finish machining. All these operations require different tool materials, tip sizes and shapes, etc. Boring or like machining operations will be greatly facilitated if a single cutting tool can be used for a variety of cutting jobs.

SUMMARY OF THE INVENTION

The present invention overcomes the limitations, without sacrificing the advantages, of the prior art spindle mechanism of the type incorporating a worm and ball nut assembly and provides an improved device which assures accurate control of the cutting radius and, in consequence, precise cutting operation throughout the expected lifetime of the machine tool.

Further the invention enables the use of the improved spindle mechanism for two or more different cutting operations by means of a single tool, thereby making possible a drastic decrease in the number of the cutting tools that must be prepared for machining operations of the class under consideration.

Stated briefly in one aspect thereof, the invention provides a spindle mechanism comprising a dual spindle assembly having an inner member rotatably received in a hollow formed eccentrically in an outer member. One end of the inner spindle member is adapted for eccentrically holding a cutting tool. The degree of eccentricity of the cutting tool from the axis of the inner spindle member is equal to the degree of eccentricity of the axis of the inner spindle member from that of the outer spindle member. A plurality of worms are rotatably supported in parallel relation to the spindle assembly and are geared or otherwise connected to each other for joint rotation. Each worm has mounted thereon a ball nut movable axially with the rotation of the worm. All the ball nuts are rigidly interconnected by a connector movable linearly therewith along the spindle assembly. Means are provided for translating the linear motion of the connector into the desired relative angular displacement of the inner and outer spindle members.

It is to be noted that the invention employs several worms which, preferably, are arranged at constant angular spacings about the axis of the spindle assembly, and the connector interconnecting the ball nuts on these worms encircles the spindle assembly. Thus the worms conjointly bear the reactive forces of cutting operation and so prevent the possible deformation of the spindle members and other parts of the mechanism. Accordingly, as the worms are synchronously revolved as by a servomotor, the spindle members will undergo relative angular displacement exactly to a required degree thereby making possible the precise control of the cutting radius and, therefore, the cutting of work to very stringent dimensional tolerances.

Another advantage is that the worms with the ball nuts thereon, and the means for translating the linear motion of the ball nuts into the relative rotation of the nested spindle members, are so arranged that the spindle assembly can be coaxially coupled to means for driving the same for cutting operation. The driving means may include means for changing the speed of rotation of the spindle assembly.

According to another aspect of the invention there is provided a method of operating the above improved spindle mechanism with combined use of a multitip cutting tool having two or more tips equidistantly positioned with respect to the axis of rotation thereof. Before mounting the cutting tool the inner and outer spindle members are revolved relative to each other to bring the eccentric tool mounting hole in the inner spindle member into axial alignment with the outer spindle member. Then the cutting tool is engaged in the mounting hole in the inner spindle member, in such an angular position that one of the tool tips selected for use lies on a line passing the axes of the spindle members and on that side of the outer spindle member axis which is opposite the side where the inner spindle member axis is positioned. Then the two spindle members are revolved relative to each other to set the selected tool tip at a desired cutting radius with respect to the axis of the complete spindle assembly.

During the subsequent boring or like operation by the selected tool tip, the other tips or tips of the tool do not interfere with such operation because their radii of revolution are less than that of the selected tip. The above tool mounting procedure may be repeated for each tip of the tool. Thus a single cutting tool having a plurality of tips of different characters lends itself to use, in conjunction with the improved spindle mechanism, for correspondingly different machining operations.

The above and other features and advantages of this invention and the manner of realizing them will become more apparent, and the invention itself will best be understood, from a study of the following description and appended claims, wtih reference had to the attached drawings showing a preferred embodiment of the invention.

DETAILED DESCRIPTION OF THE INVENTION

Figure 1:
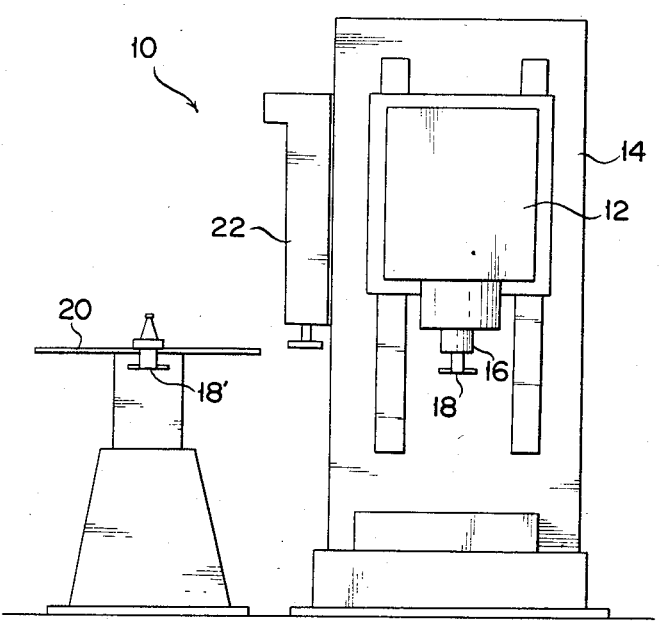
FIG. 1 is an elevation of an example of machine tool in which there can be incorporated the improved spindle mechanism of this invention.

The spindle mechanism in accordance with the present invention finds use in a machine tool of the type illustrated in FIG. 1 and generally designated 10. The illustrated machine tool 10 has a spindle head 12 movable up and down along a column 14. Depending from the spindle head 12 is a spindle mechanism 16 forming the gist of the invention. A multitip cutting tool 18 is shown mounted to the spindle mechanism 16. Both spindle mechanism 16 and cutting tool 18 will be detailed subsequently. Disposed on one side of the column 14 is a tool magazine 20 holding one or more cutting tools 18' for interchangeable use with the tool 18 now shown mounted to the spindle mechanism 16. A tool changer 22 effects such a change between the tools 18 and 18' to adapt the machine for a variety of cutting operations.

Figure 2:
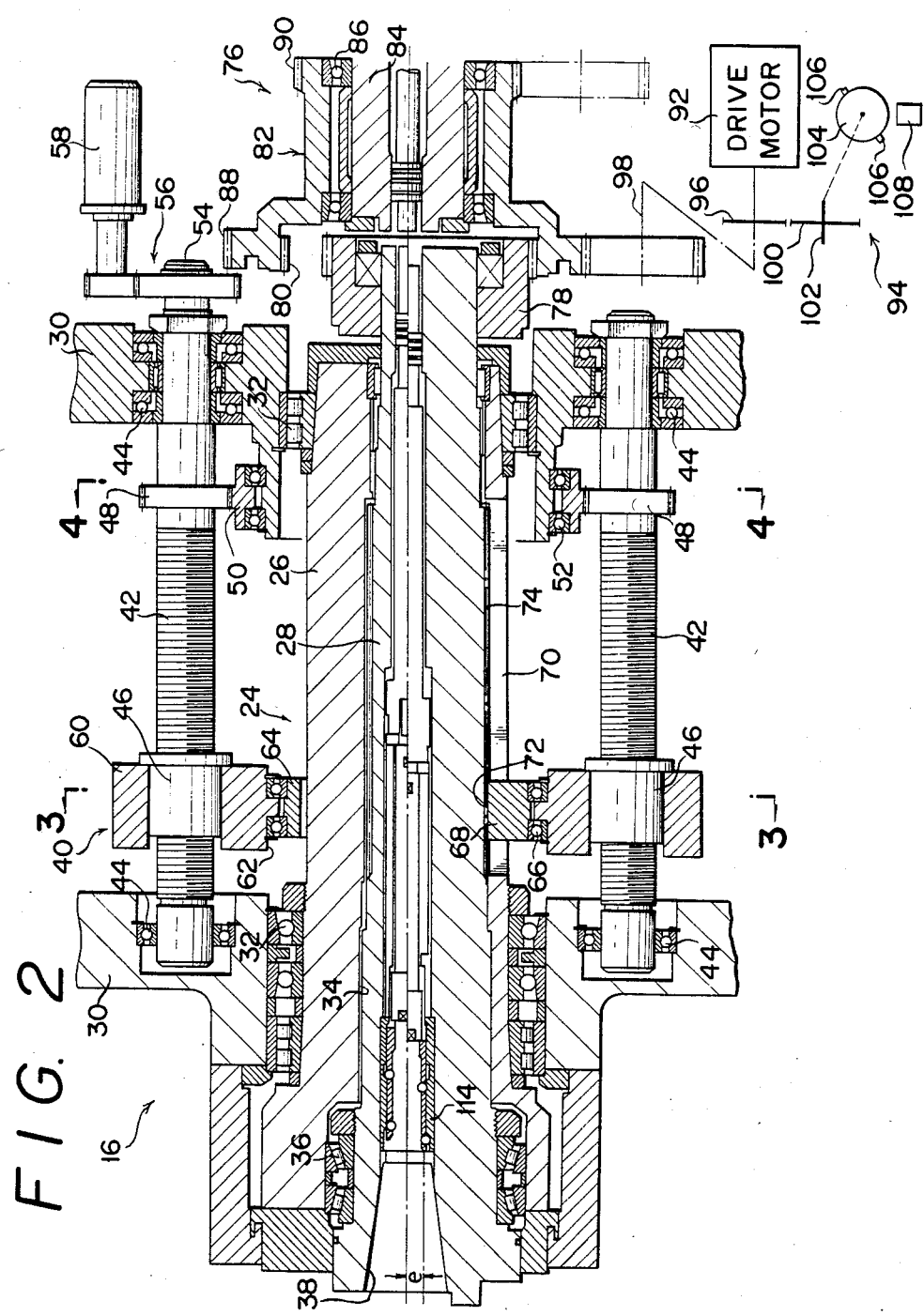
FIG. 2 is an axial section through the improved spindle mechanism constructed in accordance with the novel concepts of the invention.

FIG. 2 is a detailed illustration of the improved spindle mechanism 16. It includes a dual spindle assembly 24 comprising an outer spindle member 26 and an inner spindle member 28, as shown also in FIG. 3. The outer spindle member 26 is rotatably mounted to a spindle housing 30 via bearings 32. A hollow 34 extends longitudinally and eccentrically through the outer spindle member 26. The inner spindle member 28 is rotatably received in this hollow 34 via bearings 36. The axis of the hollow 34, and therefore of the inner spindle member 28, is offset from the axis of the outer spindle member 26 by e. The inner spindle member 28 has a tapered hole 38 formed eccentrically in one end for holding the cutting tool 18 or 18' in a manner yet to be described. The axis of this tool mounting hole 38, and therefore of the cutting tool 18 or 18' engaged therein, is offset from the axis of the inner spindle member 28 by e. It will thus be understood that the cutting radius of the cutting tool 18 or 18' being held by the inner spindle member 28 is continuously variable by causing relative angular displacement of the nested spindle members 26 and 28.

Provided for such relative angular displacement of the spindle members 26 and 28 are a worm and ball nut mechanism 40 capable of converting rotary motion into linear motion. The worm and ball nut mechanism 40 comprises a plurality of, three in the illustrated embodiment, worms 42 extending parallel to the spindle assembly 24 and each having its opposite ends rotatably journaled in bearings 44 on the spindle housing 30. As clearly seen in FIG. 3, the three worms 42 are arranged at equal distances from, and at constant angular spacings about, the axis of the spindle assembly 24 or of its outer member 26. Each worm 42 has a ball nut 46 mounted thereon. As is well known, the ball nuts 46 travel axially of the worms 42 with the rotation of the latter.

Figure 4:
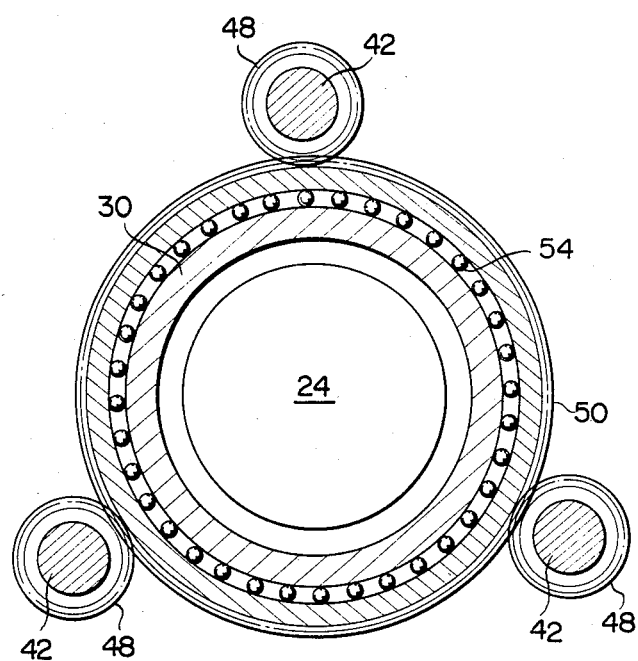
FIG. 4 is another transverse section through the spindle mechanism, taken along the line 4—4 in FIG. 2.

The rotations of the worms 42 must be exactly synchronized for the precise adjustment of the cutting radius. To this end each worm 42 has a pinion 48 nonrotatably mounted thereon adjacent one end. FIG. 4 indicates that the pinions 48 on all the worms 42 mesh with a synchronizing gear 50 rotatably mounted to the spindle housing 30 via a bearing 52 in concentric relation with the spindle assembly 24. One of the worms 42 has an extension 54 projecting out of the spindle housing 30. This worm extension is geared at 56 to a servomotor 58. Thus the rotation of the servomotor 58 results in the synchronous rotation of all the worms 42 and, consequently, in the linear travel of the ball nuts 46 back and forth along the worms depending upon the direction of rotation of the servomotor.

Figure 3:
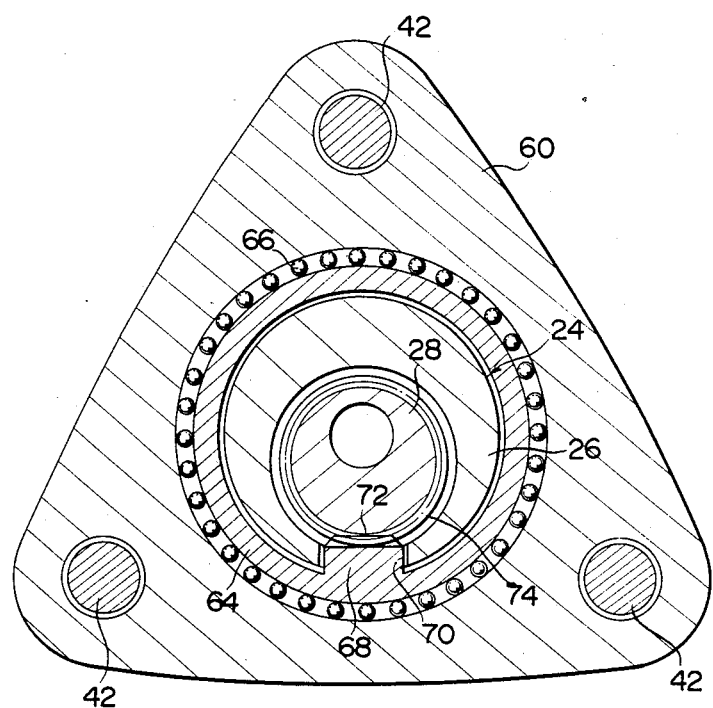
FIG. 3 is a transverse section through the spindle mechanism, taken along the line 3—3 in FIG. 2.

As shown in both FIGS. 2 and 3, the three ball nuts 46 of the worm and ball nut mechanism 40 are all rigidly interconnected by a connector 60 of approximately triangular shape having a hole 62 defined centrally therein to allow the spindle assembly 24 to pass therethrough with considerable clearance. A ring 64 is rotatably mounted in the hole 62 in the connector 60 via bearings 66 so as to concentrically surround the spindle assembly 24. Although rotatably relative to the connector 60, the ring 64 is constrained to linear movement therewith and with the ball nuts 46 along the axis of the spindle assembly 24. The ring 64 is formed to include a radially inward projection 68. This projection is movably received in a slot 70 cut longitudinally in the outer spindle member 26 to expose part of the outer surface of the inner spindle member 28. The ring pojection 68 has a series of screw thread fractions 72, preferably trapezoidal in shape, cut in its inside surface to mate with an external screw thread 74 of corresponding shape on the inner spindle member 28. The linear travel of the ring 64 with the ball nuts 46 results, therefore, in the rotation of the inner spindle member 28 relative to the outer spindle member 26.

FIG. 2 further illustrates a drive mechanism 76 for revolving the spindle assembly 24 at two different speeds for cutting operation. The drive mechanism 76 includes a pinion 78 fixedly mounted on the rear end of the inner spindle member 28 in axial alignment therewith. The pinion 78 meshes with a set of internal gear teeth 80 of a gear wheel 82 which is rotatably mounted on a support shaft 84 via bearings 86. The gear wheel 82 has further formed thereon two sets of external gear teeth 88 and 90 of different diameters. These sets of external gear teeth 88 and 90 are to be selectively coupled to a drive motor 92 via suitable gearing and shafting. The larger diameter gear tooth set 88 is for use in driving the spindle assembly 24 at low speed, and the smaller diameter gear tooth set 90 in driving the spindle assembly at high speed.

As schematically depicted at 94 in FIG. 2, means are provided for causing the rotation of the spindle assembly 24 through preassigned angles in order to adjust the cutting radii of the multitip cutting tool 18 or 18'. Such means 94 include a pinion 96 on a shaft 98 connecting the larger diameter gear tooth set 88 on the gear wheel 82 to the drive motor 92. The pinion 96 meshes with a gear 100 on a shaft 102. Rotatable with this shaft 102, and therefore with the spindle assembly 24, is a disk 104 having a plurality of, two for instance, switch actuators 106 at prescribed circumferential spacings. A switch assembly is provided at 108 for activation by the actuators 106 on the rotary disk 104.

Figure 5:
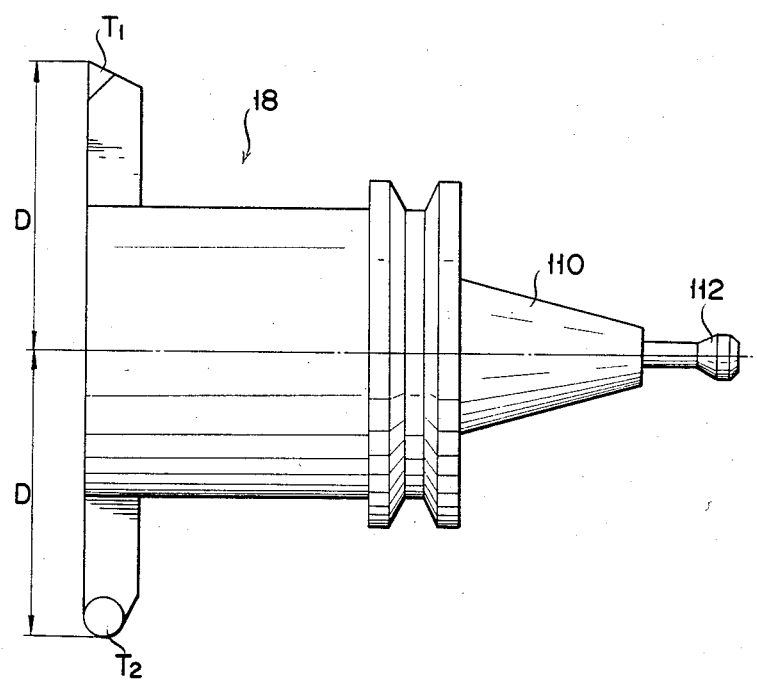
FIG. 5 is a side elevation of an example of multitip cutting tool for use with the spindle mechanism of FIG. 2, the exemplified cutting tool having two tips.

FIG. 5 illustrates on an enlarged scale the multitip cutting tool 18 for use with the spindle mechanism 16. This particular cutting tool 18 is shown to have two tips T1 and T2 of different characters angularly spaced 180 degrees from each other about the axis of the tool and positioned at the same distance D from the tool axis. The base end portion of the cutting tool 18 is shaped into a taper 110 to fit in the tapered mounting hole 38, FIG. 2, in the front end of the inner spindle member 28. Projecting further rearwardly from the taper 110 is a plug 112 to be releasably engaged in a socket 114, FIG. 2, provided internally of the inner spindle member 28. The socket 114 is movable axially of the inner spindle member 28 for engaging and disengaging the tool plug 112.

Figure 6A:
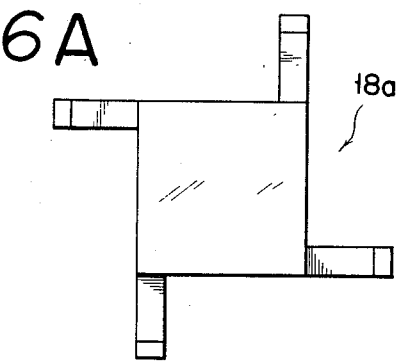
FIGS. 6A, 6B and 6C are front elevations of additional examples of multitip cutting tools for use with the spindle mechanism of FIG. 2.
Figure 6B:
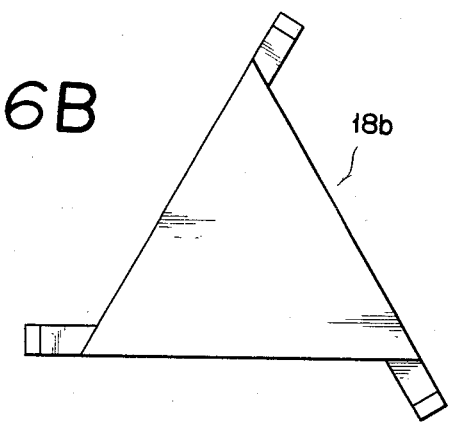
Figure 6C:
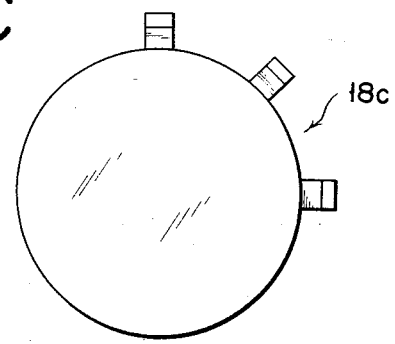

The spindle mechanism 16 finds use with other types of multitip cutting tools shown at 18a, 18b and 18c in FIGS. 6A, 6B and 6C. The tool 18a of FIG. 6A has four tips whereas the tools 18b and 18c of FIGS. 6B and 6C has three tips. As will be noted from these figures, the tips need not be arranged at constrant angular spacings about the tool axis, as in the tool 18c of FIG. 6C. In all these tools, however, each set of tips are equidistantly positioned with respect to the tool axis.

In operation, as the worms 42 of the worm and ball nut mechanism 40 are set into synchronous rotation in either direction by the servomotor 58, the ball nuts 46 travel axially along the worms together with the connector 60 and ring 64 in the direction determined by the rotative direction of the worms. The ring 64 has the inward projection 68 in threaded engagement with the inner spindle member 28, so that the linear travel of the ball nuts 46 is translated into the rotation of the inner spindle member 28 relative to the outer spindle member 26. The rotative direction of the inner spindle member 28 relative to the outer spindle member 26 depends, of course, upon that of the worms 42.

Figure 7:
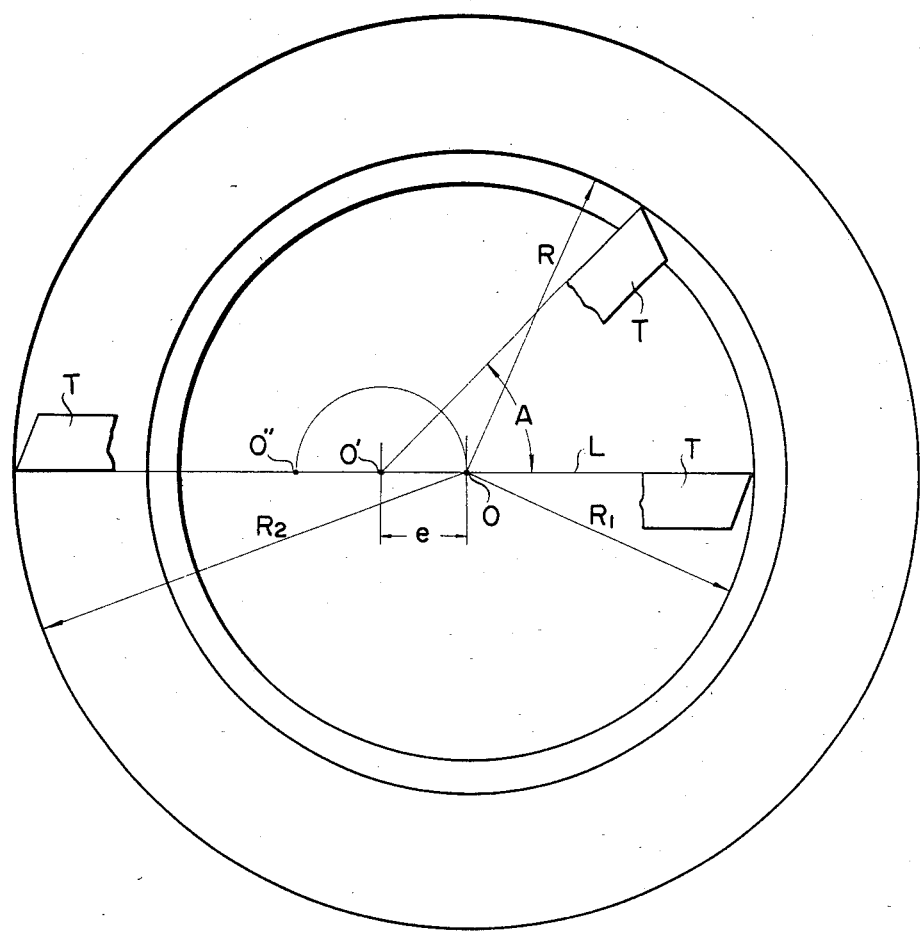
FIG. 7 is a diagram explanatory of how the cutting radius is varied continuously by the spindle mechanism of this invention.

How the above rotation of the inner spindle member 28 relative to the outer spindle member 26 results in a change in the cutting radius of the tool mounted thereto will be understood from a consideration of FIG. 7. The various indicia used in this figure are defined as follows:

O = the axis of the outer spindle member 26;
O' = the axis of the inner spindle member 28;
O'' = the axis of the mounting hole 38 in the inner spindle member 28, or of the tool engaged therein, at its farthest point from the axis O of the outer spindle member 26;
L = the notional line passing the axis O and O' of the outer and inner spindle members;
T = the tool tip;
A = the angle of eccentricity, i.e., the angle between the line L and a line connecting the tool tip T and the axis O' of the inner spindle member 28;
R = the cutting radius;
R1 = the minimum cutting radius; and
R2 = the maximum cutting radius.

The relative angular displacement of the outer 26 and inner 28 spindle members results in a change in the angle of eccentricity A and so in the cutting radius R. The center of the cutting tool moves arcuately with the radius e about the axis O' of the inner spindle member 28. The cutting radius R of the tool tip T is shortest (R1) when the tool axis is at the axis O of the outer spindle member 26, and longest (R2) when the tool axis is at O''. Within these limits the cutting radius R may be determined as required.

With the cutting radius of the tool selected as above, the drive motor 92 may be set into rotation to drive the spindle assembly 24 via either of the two different diameter sets of gear teeth 88 and 90 on the gear wheel 82. Although the gear wheel 82 is coupled only to the inner spindle member 28 via the internal gear 80 and pinion 78, the outer spindle member 26 revolves about its own axis with the inner spindle member.

Figure 8:
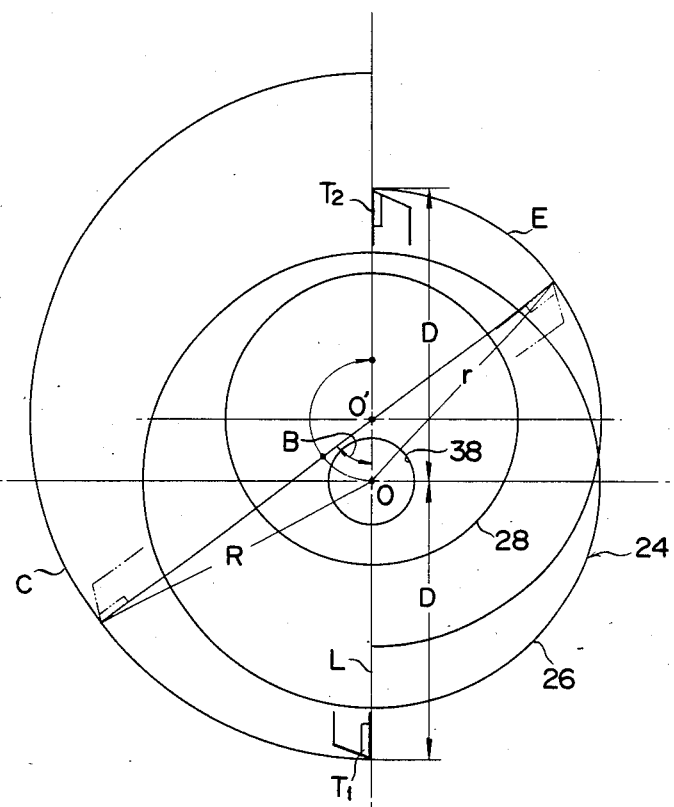
FIG. 8 is a diagram explanatory of how the two tip cutting tool of FIG. 5 is used with the spindle mechanism in accordance with the method of this invention.

FIG. 8 is explanatory of how the two tip cutting tool 18 of FIG. 5 is used with the spindle mechanism 16 in accordance with the method of this invention. Before mounting the tool 18 the inner spindle member 28 may be turned relative to the outer spindle member 26 until the mounting hole 38 in the inner spindle member comes into axial alignment with the outer spindle member as in FIG. 8. In this figure, therefore, the letter O denotes both the axis of the outer spindle member 26 and the axis of the mounting hole 38. Then the cutting tool 18 may be mounted to the inner spindle member 28 by inserting its taper 110 in the mounting hole 38. The angular position of the mounted tool 18 with respect to the spindle assembly 24 should be such that the two tips T1 and T2 of the tool are on the line L passing the axis O of the outer spindle member 26 (and of the mounting hole 38) and the axis O' of the inner spindle member 28. Further, if the first tool tip T1 is intended for use, then this tip should be positioned on that side of the the outer spindle member axis O which is opposite to the side where the of the inner spindle member axis O' is located. Both tool tips T1 and T2 are now at the same distance D from the outer spindle member axis O.

Then the inner spindle member 28 may be turned a certain angle B in, for instance, a clockwise direction. The first tool tip T1, which has been farther away from the inner spindle member axis O' than has been the second tool tip T2, will move apart from the outer spindle member axis O as it follows an arcuate path C centered about the inner spindle member axis O'. Thus the cutting radius R of the first tool tip T1 gradually increases. The second tool tip T2, on the other hand, will move closer to the outer spindle member axis O as it follows an arcuate path E centered about the inner spindle member axis O'. The cutting radius r of the second tip T1 gradually decreases.

With the inner spindle member 28 held in the position of B degrees from its FIG. 8 position, the spindle assembly 24 may be driven by the drive motor 92. The first tool tip T1 can thus be put to boring operation with the cutting radius R. Since the cutting radius for the second tool tip T2 is less than that of the first tool tip T1, it will not interfere with the boring operation by the first tool tip. The first tool tip T1 can thus be used for boring when the inner spindle member 28 is turned in either direction from its FIG. 8 position up to 180 degrees. Its cutting radius is variable from D, the radius of the tool 18, up to D plus twice the distance between the outer and inner spindle member axes O and O'.

For the use of the second tool tip T2 for boring operation after the use of the first tool tip T1, the mounting hole 38 in the inner spindle member 28 may be brought back into axial alignment with the outer spindle member 26. Then the tool 18 may be withdrawn from the mounting hole 38. Then, with the spindle assembly 24 held standing still, the tool 18 may be turned 180 degrees and then remounted to the inner spindle member 28. Now the positions of the tool tips T1 and T2 are reversed from their FIG. 8 positions. Then the inner spindle member 28 may be turned a required angle to set the second tool tip T2 at a desired cutting radius. The subsequent revolution of the spindle assembly 24 by the drive motor 92 makes possible the boring of the work with the second tool tip T2.

It is thus seen that the invention permits two different cutting operations by means of the two different tips T1 and T2 attached to one and the same tool 18.

In the above described method of this invention the tool 18 has been turned 180 degrees with the spindle assembly 24 held standing still, for a change from one tool tip to the other. Alternatively, however, the complete spindle assembly 24 may be turned 180 degrees after withdrawing the cutting tool 18 from the mounting hole 38 in the inner spindle member 28. Then, with the mounting hole 38 in axial alignment with the outer spindle member 26, the tool 18 may be reinserted in the mounting hole. It is for such rotation of the spindle assembly 26 through preassigned angles that the spindle mechanism 16 of FIG. 2 is provided with the means 94 comprising the actuators 106 on the rotary disk 104 and the switch assembly 108. The two switch actuators 106 are of course associated with the two tips T1 and T2 of the tool 18.

Figure 9:
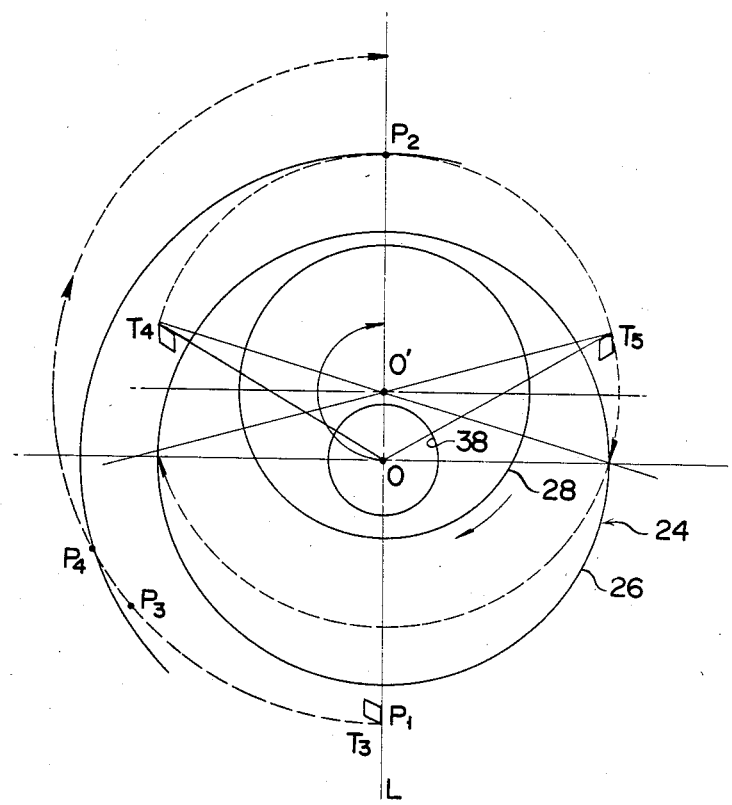
FIG. 9 is a similar diagram explanatory of how the three tip cutting tool of FIG. 6B is used with the spindle mechanism in accordance with the method of the invention.

The number of tips on each multitip cutting tool for use with the spindle mechanism 16 is not limited to two. FIG. 9 illustrates a method of using the three tip cutting tool 18b of FIG. 6B with the spindle mechanism 16. The three tool tips are herein designated T3, T4 and T5. These tool tips are at the same distance from the tool axis and are at constant angular spacings about the same.

As in the above described case of the two tip cutting tool the mounting hole 38 in the inner spindle member 28 is first brought into axial alignment with the outer spindle member 26. The three tip cutting tool is so mounted to the inner spindle member 28 that the first tool tip T3 intended for use is positioned at a point P1 on the line L passing the axes O and O' of the outer and inner spindle members 26 and 28, and on the side of the outer spindle member axis O away from the inner spindle member axis O'. Then, as the inner spindle member 28 is revolved in a clockwise direction, for instance, the cutting radius of the first tool tip T3 gradually increases. In this case, however, the second tool tip T4 on the left hand side of the line L also increases until it comes to a point P2 on the line L. When the second tool tip T4 is at the point P2, the first tool tip T3 is at a point P3. The distance between the point P3 and the outer spindle member axis O is less than the distance between the point P2 and the outer spindle member axis O. Thus the first tool tip T3 cannot be used for boring between the points P1 and P3.

The cutting radius of the first tool tip T3 further increases, whereas that of the second tool tip T4 starts decreasing, with the continued clockwise rotation of the inner spindle member 28 relative to the outer spindle member 26. By the time the first tool tip T3 reaches a point P4, at the same distance from the outer spindle member axis O as the point P2, its cutting radius has become greater than that of the second tool tip T4. Boring operation by the first tool tip T3 thus becomes possible at a certain point intermediate the points P3 and P4. The third tool tip T5 moves with a constantly decreasing distance from the outer spindle member axis O as the inner spindle member 28 is revolved as above relative to the outer spindle member 26, so that this tip presents no problem.

As has been explained in connection with FIG. 8, the above procedure may be repeated for each of the other tool tips T4 and T5. The invention thus allows cutting operations by the three different tips of the same tool. In this case, however, each tool tip positioned at the point P1 cannot be put to boring until it travels past the midpoint between the points P3 and P4 with the clockwise rotation of the inner spindle member 28 relative to the outer spindle member 26. As desired, therefore, the second tool tip T4 instead of the first T3 may first be used in the tool arrangement of FIG. 9, and then the first tool tip may be used without remounting the complete tool.

As has also been set forth with reference to FIG. 8, either the spindle assembly 24 or the cutting tool may be revolved a required angle with respect to the other at the time of tool remounting. If the spindle assembly is to be so turned, then the number and angular positions of the switch actuators on the rotary disk 104, FIG. 2, should of course correspond to those of the tips on the cutting tool.

Although the method of this invention has been described in detail only in conjunction with two and three tip cutting tools, these are by way of example only. The inventive method finds application in tools having other numbers of tips. Further the tips need not be arranged at constant angular spacings. FIGS. 6A and 6C illustrate such additional examples of cutting tools.

What is claimed is:

1. A spindle mechanism for a machine tool providing for a continuous change in the radius of revolution of a cutting tool, comprising:
   (a) support means;
   (b) a spindle assembly and means rotatably mounting said spindle assembly to the support means, the spindle assembly comprising an outer member having a bore formed longitudinally and eccentricallly therein, and an inner member means rotatably mounting said inner assembly in the bore in the outer assembly, drive means for roating said inner member, the inner member having one end adapted for eccentrically holding the cutting tool, the degree of eccentricity of the cutting tool from the axis of the inner member being equal to the degree of eccentricity of the axis of the inner member from the axis of the outer member;
   (c) a plurality of worms and means rotatably mounting said worms to the support means, said worms extending parallel to the spindle assembly;
   (d) means synchronizing the rotation of the worms;
   (e) means controllably imparting bidirectional rotation to the worms;
   (f) a plurality of ball nuts mounted one on each worm and axially movable along the same with the rotation of said worms;
   (g) a connector rigidly interconnecting the ball nuts and traveling linearly therewith along the spindle assembly; and
   (h) means translating the linear motion of the connector into the relative rotation of the outer an inner members of the spindle assembly.

2. The spindle mechanism of claim 1 wherein the worms are arranged at angular spacings about and at the same distance from a common axis, and wherein the synchronizing means comprises:
   (a) a first gear mounted to the support means for rotation about the common axis; and
   (b) a second gear nonrotatably mounted on each worm and meshing with the first gear.

3. The spindle mechanism of claim 1 wherein the connector surrounds the spindle assembly and wherein the translating means comprises:
   (a) a ring and means rotatably mounting said ring internally of the connector and concentrically surrounding the spindle assembly, the ring being constrained to linear movement with the connector along the spindle assembly;
   (b) there being a slot cut longitudinally in the outer member of the spindle member to expose part of the inner member thereof; and
   (c) an inward projection on the ring making threaded engagement with the inner member of the spindle assembly through the slot in the outer member thereof for causing the rotation of the inner member relative to the outer member with the linear travel of the connector along the spindle assembly.

4. The spindle mechanism of claim 1 further comprising drive means for revolving the spindle assembly at a plurality of different speeds.

5. The spindle mechanism of claim 4 wherein the drive means comprises:
   (a) a pinion nonrotatably mounted on the inner member of the spindle assembly in axial alignment therewith;
   (b) a gear wheel rotatably supported in axial alignment with the outer member of the spindle assembly;
   (c) a set of internal gear teeth formed on the gear wheel to mesh with the pinion on the inner member of the spindle assembly; and
   (d) a plurality of sets of external gear teeth formed on the gear wheel with different diameters.

6. The spindle mechanism of claim 1 futher comprising means for causing the rotation of the spindle assembly through preassigned angles only.

* * * * *